(12) United States Patent
Denis

(10) Patent No.: US 7,881,835 B2
(45) Date of Patent: Feb. 1, 2011

(54) METHOD AND SYSTEM FOR CONTROLLING START-UP OF A MOTOR VEHICLE BY DIALOGUE OF THE ENGINE CONTROLLING COMPUTER WITH THE PILOTED MECHANICAL GEARBOX, DURING RESTART OF THE VEHICLE IN STOP AND START MODE

(75) Inventor: Jean-Christophe Denis, Puteaux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 307 days.

(21) Appl. No.: 11/910,852

(22) PCT Filed: Mar. 31, 2006

(86) PCT No.: PCT/FR2006/050278

§ 371 (c)(1),
(2), (4) Date: Mar. 14, 2008

(87) PCT Pub. No.: WO2006/106254

PCT Pub. Date: Oct. 12, 2006

(65) Prior Publication Data

US 2008/0318731 A1 Dec. 25, 2008

(30) Foreign Application Priority Data

Apr. 6, 2005 (FR) .................................. 05 50886

(51) Int. Cl.
*G01M 17/00* (2006.01)

(52) U.S. Cl. .............................. 701/29; 701/36; 701/54; 701/70; 477/99

(58) Field of Classification Search .................... 701/29, 701/36, 51, 54, 70, 84; 477/99, 110, 111
See application file for complete search history.

(56) References Cited

U.S. PATENT DOCUMENTS

| 5,653,659 | A | 8/1997 | Kunibe et al. |
| 6,527,672 | B1 * | 3/2003 | Henneken et al. ........... 477/125 |
| 2002/0103745 | A1 * | 8/2002 | Lof et al. .................... 705/37 |
| 2005/0014605 | A1 | 1/2005 | Ries-Mueller |

FOREIGN PATENT DOCUMENTS

| DE | 10250729 A1 | 5/2004 |
| EP | 1052400 A | 11/2000 |
| FR | 2786739 A | 6/2000 |
| FR | 2851629 A | 8/2004 |

* cited by examiner

OTHER PUBLICATIONS

International Search Report mailed Oct. 19, 2006 in PCT/FR2006/050278.

*Primary Examiner*—Gertrude Arthur Jeanglaud
(74) *Attorney, Agent, or Firm*—Nicolas E. Seckel

(57) ABSTRACT

The invention concerns a method and a system for controlling start-up of a motor vehicle by dialogue of the engine controlling computer with the piloted mechanical gearbox, during a restart of the vehicle in stop and start mode. A "start-up authorization" is transmitted to the gearbox at a time t when the following three conditions are fulfilled: a) verifying the position of the accelerator pedal relative to a predetermined "threshold" position; b) the engine is in sequential injection phase; c) verifying a so-called "autonomous condition", calculated on the basis of the engine speed and of an engine speed gradient compared to a predetermined threshold value. The invention is applicable to motor vehicles.

18 Claims, 2 Drawing Sheets

METHOD AND SYSTEM FOR CONTROLLING START-UP OF A MOTOR VEHICLE BY DIALOGUE OF THE ENGINE CONTROLLING COMPUTER WITH THE PILOTED MECHANICAL GEARBOX, DURING RESTART OF THE VEHICLE IN STOP AND START MODE

BACKGROUND ART

The present invention concerns a start-off control method and system for a motor vehicle using dialogue between the engine control computer and the electronically controlled mechanical gearbox when restarting the vehicle in stop-and-start mode.

A so-called "stop-and-start" system is characterized in that the engine is turned off just before and while the vehicle is at a standstill (at traffic lights, in traffic jams, etc.). It automatically and instantaneously turns back on when the brake pedal is released when the driver wants to proceed.

A stop-and-start system offers clear advantages during engine standby phases: auditory comfort for the passengers, physical comfort due to eliminating the engine vibrations, and driving comfort, not to mention an improvement in fuel consumption.

An engine must start and transmit torque as quickly as possible. Actually, the vehicle acceptability criterion for starting off a vehicle on an uphill slope is that it move backwards no more than 20 cm on a 10% slope. This requirement effectively means that one must have an available torque of 80 N·m (Newton·meters) on the engine shaft 400 ms (milliseconds) after the brake is released.

The operating point that allows the electronically controlled mechanical gearbox (ECMG) to begin the actual "start-off" (or forward movement) of the vehicle is signaled by the engine control computer (ECC) to the electronically controlled mechanical gearbox (ECMG).

The ECMG is a gearbox with electronic control of the clutch and gear shifting. It can shift gears automatically or sequentially on the driver's initiative.

The signal from the ECC to the ECMG is sent via the CAN bus in the form of a flag, known as the "ECMG start-off authorization". A flag is a variable whose value is set at 0 or 1 based on an event; then the value of the flag is tested to find out whether or not the marked event has occurred. The CAN bus (Controller Area Network) is a network communication protocol for linking the on-vehicle equipment of a motor vehicle together.

SUMMARY OF THE INVENTION

A purpose of the present invention is to provide a method for dialogue between the ECC and the ECMG during a stop-and-start vehicle restart that makes it possible for the vehicle to start off quickly with maximum comfort, and with maximum robustness and repeatability in the various road driving situations (starting on the flat, downhill or uphill, starting from zero or non-zero engine speed, etc.).

Another purpose of the present invention is to provide a method for setting the start-off authorization flag that, through the dialogue with the ECMG, makes it possible for the vehicle to start off quickly without any jolts in the traction drive, and thus, with optimal comfort for the driver.

Another purpose of the present invention is to provide a start-off system for a motor vehicle with a stop-and-start system associated with a ECMG and control means for the "actual vehicle start-off" transmitted to said ECMG in the form of an information unit established according to the method of the invention.

In order to achieve these goals, in accordance with the invention, a control method is designed for starting off a motor vehicle in stop-and-start mode after fuel injection cut-off, which entails the following steps:
  verifying whether the position of the accelerator pedal is higher than a predetermined "threshold" position;
  verifying whether the engine is in sequential injection mode;
  verifying whether the engine speed gradient with respect to time at instant t is higher than a predetermined threshold value based on the engine speed, this condition being called the "autonomous condition";
  and if the three conditions are verified by the ECC, a "start-off authorization" is transmitted to the ECMG.

In the verification step for the autonomous condition, if this condition is not met, the method includes the step of controlling fuel injection for a time interval until said autonomous condition is met.

Calculating and verifying said autonomous condition relative to an instant t entails the following steps:
  calculating the engine speed at instant t;
  calculating the value of the engine speed gradient with respect to time at instant t;
  and comparing the value of said engine speed gradient with respect to time with a predetermined engine speed gradient threshold value based on the engine speed;
  the autonomous condition being met if the value of the engine speed gradient with respect to time is higher than said predetermined engine speed gradient threshold value based on the engine speed.

The result of comparing the value of the engine speed gradient with respect to time with a predetermined threshold value based on the engine speed is validated after a time delay.

Said engine speed gradient with respect to time is determined from the current engine speed and the speed at time step (n−1), initialized at zero.

The invention also embodies a start-off control system for a motor vehicle, with a ECC and a ECMG, additionally comprising:
  means for verifying whether the accelerator pedal position with respect to a predetermined "threshold" position is confirmed;
  means for verifying whether a so-called "autonomous condition" value, calculated from the engine speed and the engine speed gradient with respect to time and compared to a predetermined engine speed gradient threshold value, is confirmed;
  means for verifying whether the engine is in sequential injection mode;
  said verifications being carried out by the ECC.
  means for transmitting a start-off control signal or "start-off authorization" from said ECC to the ECMG if said verifications are confirmed.

Said control signal or "start-off authorization" is a signal sent by the vehicle engine control computer to the electronically controlled mechanical gearbox in the form of a flag.

BRIEF DESCRIPTION OF THE DRAWINGS

The invention will be more easily understood in the description of a nonlimiting example of an embodiment of the object of the invention, accompanied by drawings in which.

DETAILED DESCRIPTION OF PARTICULAR EMBODIMENTS

The start-off authorization is given when the three following conditions are satisfied cumulatively.

First condition C1: the "autonomous condition" is fulfilled.
Second condition C2: "Alpha pedal">Threshold $S_{Alpha}$
Third condition C3: the "full group intelligent" injection phase exit condition.

If C1, C2 and C3—conditions developed in the remainder of the present text—are met cumulatively, then the signal from the ECC to the ECMG is sent via the CAN bus in the form of the previously mentioned flag or "ECMG start-off authorization".

Figure 1:
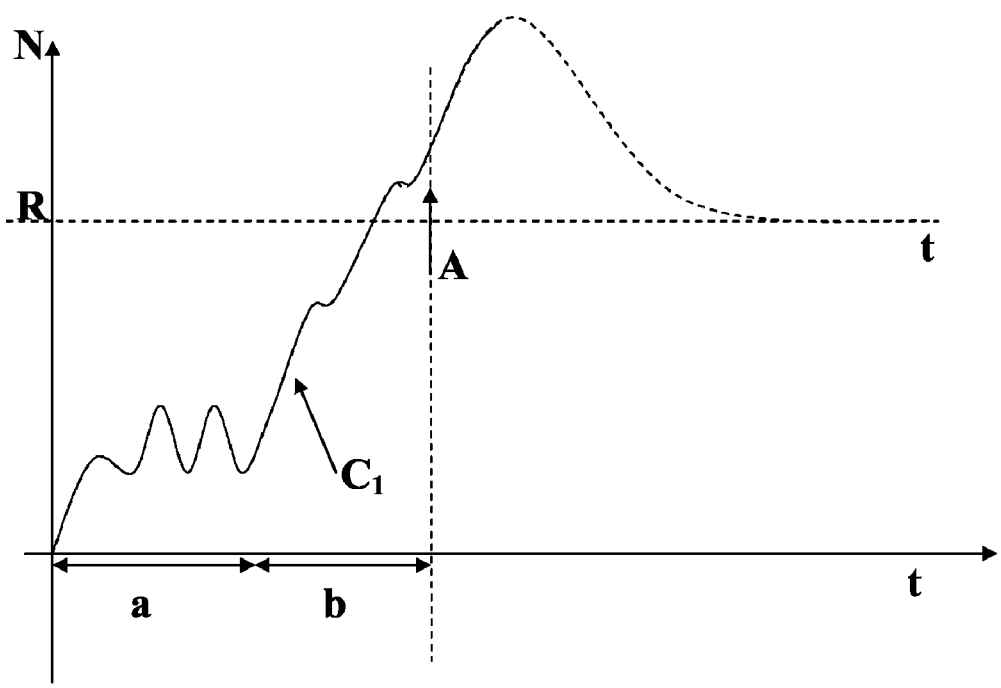
FIG. 1 is a graph showing the change over time in the engine speed.

The graph in FIG. 1 shows the change over time in the engine speed, i.e., the crankshaft speed expressed in revolutions per minute. After a first period referenced a, which is a phase powered solely by electric machine, the engine speed increases over a period referenced b, with initial combustion represented by the steeply sloping segment $C_1$. The engine speed curve peaks, and the engine speed becomes substantially constant at the idling speed value R. This value can be approximately 750 revolutions per minute.

A represents the start-off authorization sent to the ECMG.

The "autonomous condition" is defined by a threshold or "template" or "calibration" of the engine speed gradient with respect to time based on the engine speed.

Figure 2:
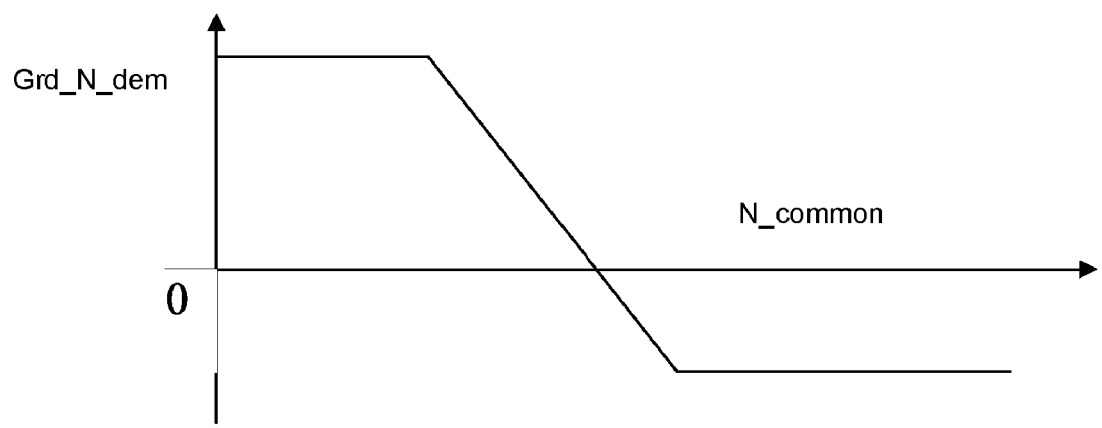
FIG. 2 is a graph showing the engine speed gradient threshold as a function of the engine speed.

The engine speed gradient threshold Grad_N_dem is determined as a function of the current engine speed by a graph or "calibration" with the shape shown in the drawing in FIG. 2. The current engine speed is the engine speed calculated from the time it took for the last half-rotation of the engine to occur. This calibration ensures that:

the engine is autonomous, and consequently no longer needs the starting device in order to finish restarting;

the electronically controlled gearbox can begin to "bite" the clutch with no risk of stalling;

the engine is beginning to transmit torque;

the engine torque is increased progressively from this moment on in order to provide optimum comfort for the driver.

The optimal calibration is determined from vehicle tests such as: starting on flat, downhill and uphill terrain with quantitative measurements of backwards movement on slopes and subjective estimates of driver comfort.

The engine speed gradient threshold is corrected by a gain factor K_Grad_N_dem (vertical expansion) based on the water temperature $T_{WATER}$. The input speed N_dem is corrected by K_N_dem (horizontal expansion), based on water temperature.

The autonomous condition is fulfilled if the following inequality is satisfied:

$$dN/dt > K\_Grad\_N\_dem(T_{WATER})*Grad\_N\_dem(K\_N\_dem(T_{WATER})*N\_common)$$

N_common is the average speed over a half-rotation of the engine, calculated by the engine control computer ECC. The engine speed gradient with respect to time (dN/dt) is determined from the current speed and the speed at time step (n−1), initialized at zero. Like the engine speed, the engine speed gradient is recalculated upon each half-rotation of the engine. At instant t=n, it is equal to the difference between the engine speed at instant t=n and the engine speed at instant t=n−1 (which corresponds to the previous half-rotation) divided by the time elapsed during the half-rotation of the engine. The engine speed gradient is initialized at zero.

This condition is validated after a time delay designated as "Tempo_cond_dem".

Figure 3:
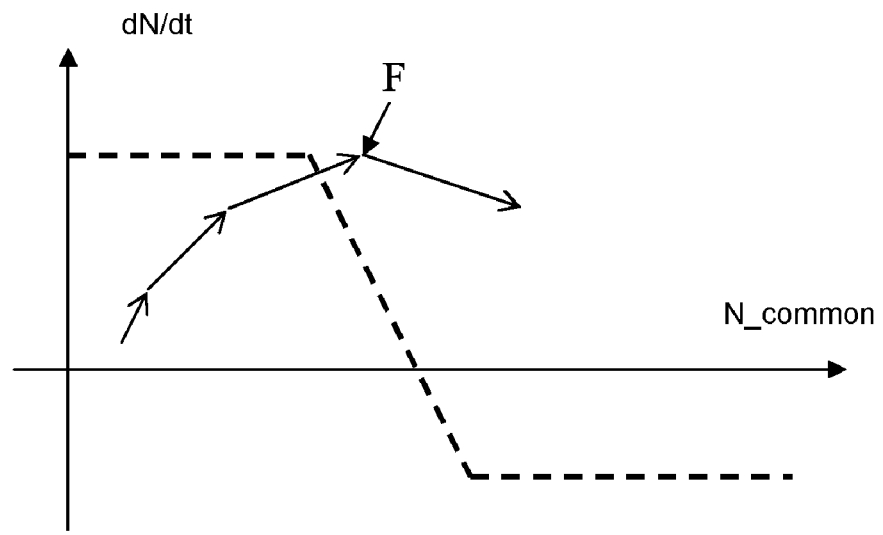
FIG. 3 illustrates how the invention is expected to operate when starting or restarting from an engine speed of zero.

Now the comparison is made between the indicator thus formulated dN/dt and the template shown in FIG. 2, for starting or restarting from an engine speed of zero. In this case, shown in FIG. 3, when the traditional starter or the alternator is shut off, as illustrated by reference F in the drawing in FIG. 3, operation as expected places the indicator above the template: the autonomous condition is fulfilled.

Figure 4:
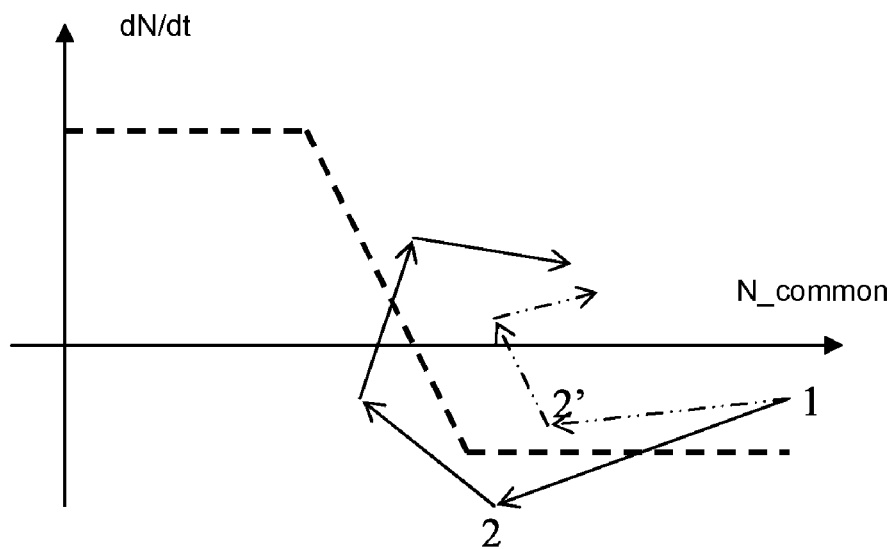
FIG. 4 illustrates how the invention is expected to operate when restarting before the engine speed has reached zero.

Illustrated in the drawing in FIG. 4 is the case of a restart before the engine speed has gone down to zero. From the initial rotating engine state (point 1), after a stop request from the stop-and-start function, whose function is to stop the engine, injection is cut off, which makes the engine speed drop (point 2 or 2'), and then there is a restart request before the engine speed has had enough time to zero out. At this point, two situations can arise: either the autonomous condition is not met or the autonomous condition is met.

In the first situation, represented by point 2 in FIG. 4, the autonomous condition is not met, which is revealed by the position of point 2 below the template. At this point, the starting device must be turned on to make it possible to satisfy the autonomous condition; in terms of graphical representation, this power raises the point back above the template, as shown in FIG. 4 by the solid lines.

In the second situation, represented by point 2' in FIG. 4, the autonomous condition is met, which is revealed by the position of point 2' above the template; the starting device does not need to be turned on; in this case the path of the broken line remains entirely above the template.

The second condition, or condition C2, is expressed in the following form:

"Alpha pedal">Threshold $S_{Alpha}$

"Alpha pedal" represents the accelerator pedal position requested by the driver, while Threshold $S_{Alpha}$ is a predetermined, constant threshold value that can be calibrated.

The third condition, or condition C3, is met upon exiting the "full group intelligent" injection phase. The so-called "full group intelligent" injection phase is the phase that corresponds to the first three injections, which occur simultaneously as soon as the engine begins to rotate (to all cylinders except the one that is on the intake stroke when the engine stops, as gas injected to this one would likely be directly exhausted). Upon exiting this phase, phased sequential injection begins, and the third condition is confirmed.

Once the three conditions C1, C2 and C3 described above are met, then the signal is sent from the ECC to the ECMG via the CAN bus in the form of the previously mentioned flag, or "ECMG start-off authorization".

The invention claimed is:

1. Start-off control method for a motor vehicle using dialogue between an engine control computer and an electronically controlled mechanical gearbox when restarting the vehicle in stop-and-start mode, wherein said method comprises the following steps:

verifying that a first condition is fulfilled, wherein said first condition is fulfilled when a position of an accelerator pedal is higher than a predetermined threshold position of the accelerator pedal;

verifying that a second condition is fulfilled, wherein said second condition is fulfilled when the engine is in sequential injection mode;

verifying that a third condition is fulfilled, wherein said third condition is fulfilled when an engine speed gradient with respect to time at instant t is higher than a predetermined threshold value based on engine speed, this third condition being called the autonomous condition;

and when the first, second and third conditions are fulfilled, transmitting a start-off authorization to the gearbox.

2. Method according to claim 1, wherein during the verification step for the autonomous condition, if this condition is not fulfilled, the method includes controlling fuel injection for a time interval until said autonomous condition is fulfilled.

3. Method according to claim 1, wherein verifying that said autonomous condition is fulfilled at an instant t includes the following steps:

calculating the engine speed at instant t;

calculating the value of the engine speed gradient with respect to time at instant t;

and comparing the value of said engine speed gradient with respect to time with a predetermined engine speed gradient threshold value based on the engine speed;

wherein the autonomous condition is fulfilled when the value of the engine speed gradient with respect to time is higher than said predetermined engine speed gradient threshold value based on the engine speed.

4. Method according to claim 3, wherein said predetermined engine speed gradient threshold value (Grad_N_dem) based on the engine speed is obtained by the following formula:

$$K\_Grad\_N\_dem(T_{WATER}) * Grad\_N\_dem(K\_N\_dem(T_{WATER}) * N\_common),$$

in which:

Grad_N_dem is a predetermined threshold value based on the engine speed;

K_Grad_N_dem is a gain factor based on water temperature;

K_N_dem($T_{WATER}$) is a correction factor based on water temperature;

$T_{WATER}$ is water temperature;

and N_common is the average speed over a half-rotation of the engine, calculated by the engine control computer.

5. Method according to claim 1, wherein a result of comparing the value of the engine speed gradient with respect to time with a predetermined threshold value based on the engine speed is validated after a time delay.

6. Method according to claim 1, wherein the engine speed gradient with respect to time is determined from a current engine speed and the engine speed at previous calculation step, initialized at zero.

7. Method according to claim 1, wherein the threshold position of the accelerator pedal is a predetermined angular value that can be calibrated.

8. Method according to claim 2, wherein verifying that said autonomous condition is fulfilled at an instant t includes the following steps:

calculating the engine speed at instant t;

calculating the value of the engine speed gradient with respect to time at instant t;

and comparing the value of said engine speed gradient with respect to time with a predetermined engine speed gradient threshold value based on the engine speed;

wherein the autonomous condition is fulfilled when the value of the engine speed gradient with respect to time is higher than said predetermined engine speed gradient threshold value based on the engine speed.

9. Method according to claim 8, wherein said predetermined engine speed gradient threshold value (Grad_N_dem) based on the engine speed is obtained by the following formula:

$$K\_Grad\_N\_dem(T_{WATER}) * Grad\_N\_dem(K\_N\_dem(T_{WATER}) * N\_common),$$

in which:

Grad_N_dem is a predetermined threshold value based on the engine speed;

K_Grad_N_dem is a gain factor based on water temperature;

K_N_dem($T_{WATER}$) is a correction factor based on water temperature;

$T_{WATER}$ is water temperature;

and N_common is the average speed over a half-rotation of the engine, calculated by the engine control computer.

10. Method according to claim 2, wherein a result of comparing the value of the engine speed gradient with respect to time with a predetermined threshold value based on the engine speed is validated after a time delay.

11. Method according to claim 3, wherein a result of comparing the value of the engine speed gradient with respect to time with a predetermined threshold value based on the engine speed is validated after a time delay.

12. Method according to claim 4, wherein a result of comparing the value of the engine speed gradient with respect to time with a predetermined threshold value based on the engine speed is validated after a time delay.

13. Method according to claim 9, wherein a result of comparing the value of the engine speed gradient with respect to time with a predetermined threshold value based on the engine speed is validated after a time delay.

14. Method according to claim 10, wherein a result of comparing the value of the engine speed gradient with respect to time with a predetermined threshold value based on the engine speed is validated after a time delay.

15. Method according to claim 2, wherein the engine speed gradient with respect to time is determined from a current engine speed and the engine speed at a previous calculation step, initialized at zero.

16. Method according to claim 3, wherein the engine speed gradient with respect to time is determined from a current engine speed and the engine speed at a previous calculation step, initialized at zero.

17. Method according to claim 4, wherein the engine speed gradient with respect to time is determined from a current engine speed and the engine speed at a previous calculation step, initialized at zero.

18. Method according to claim 9, wherein the engine speed gradient with respect to time is determined from a current engine speed and the engine speed at a previous calculation step, initialized at zero.

* * * * *